United States Patent
Yano et al.

(10) Patent No.: US 10,714,764 B2
(45) Date of Patent: Jul. 14, 2020

(54) STAINLESS STEEL SHEET FOR FUEL CELL SEPARATORS AND METHOD FOR PRODUCING THE SAME

(71) Applicant: JFE STEEL CORPORATION, Chiyoda-ku, Tokyo (JP)

(72) Inventors: Takayoshi Yano, Tokyo (JP); Shin Ishikawa, Tokyo (JP); Chikara Kami, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 226 days.

(21) Appl. No.: 16/064,633

(22) PCT Filed: Dec. 15, 2016

(86) PCT No.: PCT/JP2016/087451
§ 371 (c)(1),
(2) Date: Jun. 21, 2018

(87) PCT Pub. No.: WO2017/110656
PCT Pub. Date: Jun. 29, 2017

(65) Prior Publication Data
US 2018/0375116 A1    Dec. 27, 2018

(30) Foreign Application Priority Data
Dec. 24, 2015 (JP) .................... 2015-252293

(51) Int. Cl.
*H01M 8/0247* (2016.01)
*H01M 8/021* (2016.01)
(Continued)

(52) U.S. Cl.
CPC ........... *H01M 8/0247* (2013.01); *C25D 5/36* (2013.01); *C25D 7/00* (2013.01); *C25D 11/34* (2013.01);
(Continued)

(58) Field of Classification Search
CPC . C25D 11/34; C25D 5/36; C25D 7/00; H01M 8/0202; H01M 8/021;
(Continued)

(56) References Cited

U.S. PATENT DOCUMENTS 6,660,419 B1    12/2003  Nishida et al.
2002/0187379 A1*  12/2002  Yasuo .................. C23C 8/02
                                                429/509
(Continued)

FOREIGN PATENT DOCUMENTS

JP      H08180883 A    7/1996
JP      H10228914 A    8/1998
(Continued)

OTHER PUBLICATIONS

Mar. 7, 2017, International Search Report issued in the International Patent Application No. PCT/JP2016/087451.

*Primary Examiner* — Miriam Stagg
*Assistant Examiner* — Lilia Nedialkova
(74) *Attorney, Agent, or Firm* — Kenja IP Law PC

(57) ABSTRACT

A stainless steel sheet for fuel cell separators including a substrate made of stainless steel sheet, and low-electrical-resistivity metal particles, where the substrate has a textured structure formed on a surface thereof with the average interval between the projected parts of the textured structure being 10 nm or more and 300 nm or less, the low-electrical-resistivity metal particles have an average particle size of 50 nm to 1.0 μm, the low-electrical-resistivity metal particles are attached to the surface of the substrate having the textured structure at a density of 1.0 particle or more for 1 μm², and a ratio of the average particle size of the low-electrical-resistivity metal particles to the average interval between the projected parts is 1.0 to 15.0.

2 Claims, 2 Drawing Sheets

(51) Int. Cl.
- *H01M 8/0228* (2016.01)
- *C25D 11/34* (2006.01)
- *H01M 8/0202* (2016.01)
- *C25D 7/00* (2006.01)
- *C25D 5/36* (2006.01)
- *H01M 8/0226* (2016.01)
- *H01M 8/0243* (2016.01)
- *H01M 8/0232* (2016.01)
- *H01M 8/0245* (2016.01)
- *H01M 8/10* (2016.01)

(52) U.S. Cl.
CPC ......... *H01M 8/021* (2013.01); *H01M 8/0202* (2013.01); *H01M 8/0226* (2013.01); *H01M 8/0228* (2013.01); *H01M 8/0232* (2013.01); *H01M 8/0243* (2013.01); *H01M 8/0245* (2013.01); *H01M 8/10* (2013.01)

(58) Field of Classification Search
CPC ............. H01M 8/0226; H01M 8/0228; H01M 8/0232; H01M 8/0243; H01M 8/0245; H01M 8/0247; H01M 8/10

See application file for complete search history.

(56) References Cited

U.S. PATENT DOCUMENTS

| | | | |
|---|---|---|---|
| 2008/0233456 A1* | 9/2008 | Ishikawa | ............. C22C 38/02 |
| | | | 429/492 |
| 2009/0226785 A1 | 9/2009 | Kihira et al. | |
| 2014/0272668 A1 | 9/2014 | Nagoshi et al. | |

FOREIGN PATENT DOCUMENTS

| | | |
|---|---|---|
| JP | 2002134136 A | 5/2002 |
| JP | 2010013684 A | 1/2010 |
| WO | 0001025 A1 | 1/2000 |
| WO | 2006137584 A1 | 12/2006 |
| WO | 2013080533 A1 | 6/2013 |

* cited by examiner

• Before contact

• On contact

Broken parts on passive film and on oxide film

STAINLESS STEEL SHEET FOR FUEL CELL SEPARATORS AND METHOD FOR PRODUCING THE SAME

TECHNICAL FIELD

This disclosure relates to a stainless steel sheet for fuel cell separators excellent in contact electrical resistance (hereinafter also referred to as "contact resistance") and a method for producing the stainless steel sheet for fuel cell separators.

BACKGROUND

In recent years, fuel cells that have excellent generation efficiency and emit no carbon dioxide are being developed for global environment protection. Such a fuel cell generates electricity from hydrogen and oxygen through an electrochemical reaction. The fuel cell has a sandwich-like basic structure, and includes an electrolyte membrane (ion-exchange membrane), two electrodes (fuel electrode and air electrode), gas diffusion layers of oxygen (air) and hydrogen, and two separators.

Fuel cells are classified as phosphoric acid fuel cells, molten carbonate fuel cells, solid oxide fuel cells, alkaline fuel cells, and polymer electrolyte fuel cells (PEFC: proton-exchange membrane fuel cells or polymer electrolyte fuel cells) according to the type of electrolyte membrane used, which are each being developed.

Of these fuel cells, polymer electrolyte fuel cells have, for example, the following advantages over other fuel cells.

(a) The fuel cell operating temperature is about 80° C., so that electricity can be generated at significantly low temperature.

(b) The fuel cell body can be reduced in weight and size.

(c) The fuel cell can be started promptly, and has high fuel efficiency and power density.

Polymer electrolyte fuel cells are therefore expected to be used as power sources in electric vehicles, home or industrial stationary generators, and portable small generators.

A polymer electrolyte fuel cell extracts electricity from hydrogen and oxygen via a polymer membrane. As illustrated in FIG. 1, a membrane-electrode joined body 1 is sandwiched between gas diffusion layers 2 and 3 (for example, carbon paper) and separators (bipolar plates) 4 and 5, forming a single component (a single cell). An electromotive force is generated between the separators 4 and 5.

The membrane-electrode joined body 1 is called a membrane-electrode assembly (MEA). The membrane-electrode joined body 1 is an assembly of a polymer membrane and an electrode material such as carbon black carrying a platinum catalyst on the front and back surfaces of the membrane, and has a thickness of several 10 μm to several 100 μm. The gas diffusion layers 2 and 3 are often integrated with the membrane-electrode joined body 1.

In the case of actually using polymer electrolyte fuel cells, several tens to several hundreds of single cells such as the above are typically connected in series to form a fuel cell stack and put to use.

The separators 4 and 5 are required to function not only as (a) partition walls separating single cells,
but also as.
(b) conductors carrying generated electrons,
(c) air passages 6 through which oxygen (air) flows and hydrogen passages 7 through which hydrogen flows, and
(d) exhaust passages through which generated water or gas is exhausted (the air passages 6 or the hydrogen passages 7 also serve as the exhaust passages).

The separators therefore need to have excellent durability and electric conductivity.

Regarding durability, about 5000 hours are expected in the case of using the polymer electrolyte fuel cell as a power source in an electric vehicle, and about 40000 hours are expected in the case of using the polymer electrolyte fuel cell as a home stationary generator or the like. Since the proton conductivity of the polymer membrane (electrolyte membrane) decreases if metal ions leach due to corrosion, the separators need to be durable for long-term generation.

Regarding electric conductivity, the contact resistance between the separator and the gas diffusion layer is desirably as low as possible, because an increase in contact resistance between the separator and the gas diffusion layer causes lower generation efficiency of the polymer electrolyte fuel cell. A lower contact resistance between the separator and the gas diffusion layer contributes to a better power generation property.

Polymer electrolyte fuel cells using graphite as separators have already been commercialized. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability and reduced contact resistance.

For example, JP H8-180883 A (PTL 1) describes a technique of using, as a separator, a metal such as stainless steel or a titanium alloy that easily forms a passive film. With the technique described in PTL 1, however, the formation of the passive film causes an increase in contact resistance, and leads to lower generation efficiency. The metal material described in PTL 1 thus has problems such as a high contact resistance as compared with the graphite material.

JP H10-228914 A (PTL 2) describes a technique of plating the surface of a metal separator such as an austenitic steel sheet (SUS304) with gold to reduce contact resistance and ensure high output. However, the gold plating increases the cost.

JP 2010-13684 A (PTL 3) and WO 2013/080533 (PTL 4) describe a technique for reducing contact resistance by containing fluorine in a passive film on surface of stainless steel, which is achieved by immersing the stainless steel in a treatment solution containing fluoride ions such as hydrofluoric acid, and providing a predetermined fine textured structure on a region of the surface of the stainless steel. Unfortunately, treatment solutions containing fluoride ions such as hydrofluoric acid are chemically very active, which causes safety problems during the processing operations and during the treatment to the waste liquid discharged from the processing.

CITATION LIST

Patent Literature

PTL 1: JP H8-180883 A
PTL 2: JP H10-228914 A

PTL 3: JP 2010-13684 A
PTL 4: WO 2013/080533

SUMMARY

Technical Problem

In view of the above circumstances, it could be helpful to provide a stainless steel sheet for fuel cell separators capable of obtaining excellent contact resistance at a low-cost and safe way, as well as a method for producing the stainless steel sheet for fuel cell separators.

Solution to Problem

In order to solve the above problems, we conducted intensive studies on improving contact resistance property of a stainless steel sheet for fuel cell separators.

We at first attempted to reduce contact resistance by plating the surface of the stainless steel sheet with various low-electrical-resistivity metals under various conditions.

However, a simple process of plating with low-electrical-resistivity metal could not reduce contact resistance as much as gold plating did, no matter how the processing conditions or the metal used was adjusted.

We thus made a deeper study on how to further reduce the contact resistance using the low-electrical-resistivity metal.

As a result, we discovered that contact resistance can be significantly reduced by forming a predetermined textured structure on the surface of a stainless steel sheet substrate, attaching a predetermined amount of low-electrical-resistivity metal particles to the surface having a textured structure (hereinafter "textured surface") of the substrate, and properly controlling the ratio of the average particle size of the low-electrical-resistivity metal particles to the average interval between the projected parts.

We consider the reasons why contact resistance can be significantly reduced by forming a predetermined textured structure on the surface of a stainless steel sheet substrate, attaching a predetermined amount of low-electrical-resistivity metal particles to the textured surface of the substrate, and properly controlling the ratio of the average particle size of the low-electrical-resistivity metal particles to the average interval between the projected parts, as follows.

The stainless steel has a passive film on its surface. When using the stainless steel as fuel cell separators, the passive film increases the contact resistance. With respect to the low-electrical-resistivity metal particles such as Ag particles or Cu particles, a simple process of attaching such metal particles to the surface of the stainless steel sheet substrate cannot produce a contact resistance as low as the inherent contact resistance of the low-electrical-resistivity metal, because an oxide film forms on the surface of the metal particles in the atmosphere. This also increases the contact resistance.

As illustrated in FIG. 1, fuel cell separators apply a predetermined load to gas diffusion layers made of, for example, carbon paper or carbon cloth when contacting with the gas diffusion layers. Therefore, as illustrated in FIG. 2, by forming a predetermined textured structure on the surface of a stainless steel sheet substrate, attaching a predetermined amount of low-electrical-resistivity metal particles to the textured surface of the substrate, and properly controlling the ratio of the average particle size of the low-electrical-resistivity metal particles to the average interval between the projected parts, the low-electrical-resistivity metal particles are pressed to the projected and recessed parts on the substrate surface and the projected parts bite into the metal particles when the separator comes into contact with the gas diffusion layer. Then, a part of the passive film on the surface of the stainless steel sheet, particularly on the projected parts, breaks, and a part of the thin oxide film formed on the surface of the low-electrical-resistivity metal particles also breaks. The broken parts act as junctions, so that the stainless steel and the low-electrical-resistivity metal particles are connected (contacted) with each other not through the passive film or the oxide film. As a result, contact resistance is significantly reduced.

This disclosure is based on the aforementioned discoveries and further studies.

Specifically, the primary features of this disclosure are as described below.

1. A stainless steel sheet for fuel cell separators including a substrate made of stainless steel sheet, and low-electrical-resistivity metal particles, where the substrate has a textured structure on a surface thereof, where the textured structure includes projected parts and recessed parts, and an average interval between the projected parts is 10 nm or more and 300 nm or less, the low-electrical-resistivity metal particles have an average particle size of 50 nm to 1.0 μm, and the low-electrical-resistivity metal particles are attached to the surface of the substrate having the textured structure at a density of 1.0 particle or more for 1 μm$^2$, and a ratio of the average particle size of the low-electrical-resistivity metal particles to the average interval between the projected parts is 1.0 to 15.0.

2. A method for producing the stainless steel sheet for fuel cell separators according to 1, including subjecting a substrate made of stainless steel sheet to anode electrolytic treatment and then to plating treatment, where the plating treatment is performed in a solution containing low-electrical-resistivity metal ions.

Advantageous Effect

According to the present disclosure, it is possible to obtain a stainless steel sheet for fuel cell separators having excellent contact resistance. In addition, according to the present disclosure, there is no need to treat with, for example, hydrofluoric acid during the production or waste liquid discharged from the processing, which is extremely advantageous in production safety terms. Furthermore, the present disclosure does not require attaching low-electrical-resistivity metal particles to the entire substrate surface, which is very advantageous in cost terms.

DETAILED DESCRIPTION

Figure 1:
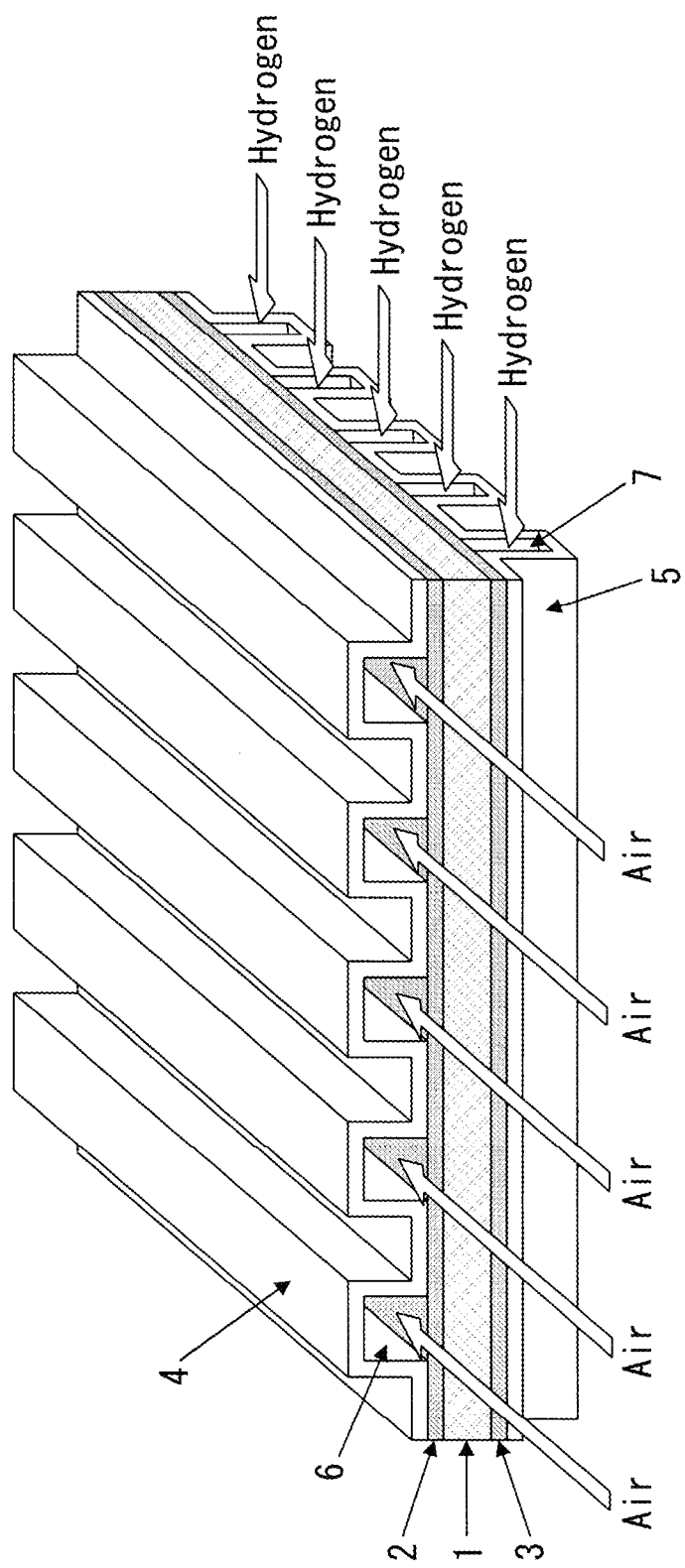
FIG. 1 schematically illustrates a basic structure of a fuel cell.

The following describes the disclosure in detail.

(1) Stainless Steel Sheet Used as the Substrate

Stainless steel sheet used as the substrate in the disclosure is not particularly limited. However, a stainless steel sheet excellent in corrosion resistance such as a ferritic stainless steel sheet, an austenitic stainless steel sheet or a dual-phase stainless steel sheet is especially advantageous.

For example, SUS447J1 containing 30 mass % of Cr and 2 mass % of Mo, SUS445J1 containing 22 mass % of Cr and 1 mass % of Mo, SUS443J1 containing 21 mass % of Cr, SUS430J1L containing 18 mass % of Cr, SUS316L containing 18 mass % of Cr, 12 mass % of Ni and 2 mass % of Mo, and other stainless steel sheets can be suitably used. In particular, SUS447J1 containing about 30 mass % of Cr has a high corrosion resistance, and is therefore especially advantageous as a separator substrate of polymer electrolyte fuel cells whose working environment requires a high corrosion resistance.

In view of the installation space and weight when stacking fuel cells, the sheet thickness of the stainless steel for separators is preferably in a range of 0.03 mm to 0.3 mm. When the sheet thickness of the stainless steel for separators is less than 0.03 mm, the efficiency of producing stainless steel decreases. On the other hand, a sheet thickness exceeding 0.3 mm increases the installation space and weight when stacking fuel cells. The sheet thickness is more preferably in a range of 0.03 mm to 0.1 mm.

(2) Textured Structure on the Surface of the Stainless Steel Sheet Substrate

Forming a predetermined textured structure including projected parts and recessed parts on the surface of the stainless steel sheet substrate is important for the presently disclosed stainless steel sheet for fuel cell separators. The following describes the textured structure.

Average interval between the projected parts: 10 nm or more and 300 nm or less

As mentioned above and as illustrated in FIG. 2, the low-electrical-resistivity metal particles are pressed to the projected and recessed parts on the substrate surface and the projected parts bite into the metal particles when the separator using the presently disclosed stainless steel sheet for fuel cell separators comes into contact with the gas diffusion layer. Then, a part of the passive film on the surface of the stainless steel sheet, particularly on the projected parts, breaks, and a part of the thin oxide film formed on the surface of the low-electrical-resistivity metal particles also breaks. The broken parts act as junctions, so that the stainless steel and the low-electrical-resistivity metal particles are connected (contacted) with each other not through the passive film or the oxide film. As a result, contact resistance is significantly reduced. Therefore, considering the conditions such as the particle size of the low-electrical-resistivity metal particles as described below, the shape of the textured structure, particularly the average interval between the projected parts is important for reducing the contact resistance.

When the average interval between the projected parts is less than 10 nm, the projected and recessed parts are too fine so that the projected parts on the substrate surface cannot sufficiently bite into the low-electrical-resistivity metal particles. As a result, a desired contact resistance cannot be obtained. On the other hand, when the average interval between the projected parts is more than 300 nm, which is too large as compared with the particle size of the low-electrical-resistivity metal particles attached to the substrate surface, the above-described effect of reducing contact resistance cannot be obtained. As a result, a desired contact resistance cannot be obtained, either.

Therefore, the average interval between the projected parts is 10 nm or more and 300 nm or less. The average interval between the projected parts is preferably 20 nm or more. The average interval between the projected parts is preferably 200 nm or less.

The average interval between the projected parts is calculated by the following method. Observe the surface of the stainless steel sheet substrate under a scanning electron microscope (FE-SEM, S-4100 made by Hitachi) with 30000 magnification for 10 locations to collect secondary electron images (SEM photographs), where the scanning electron microscope is equipped with cold field emission electron source and the accelerating voltage is set to 3 kV. For each location on the secondary electron images (SEM photographs), draw three straight lines at 1 μm intervals in the rolling direction and in the direction orthogonal to the rolling direction respectively, measure each center-to-center distance between the projected parts on the straight lines, and average the results to obtain the average interval between the projected parts.

In the secondary electron images (SEM photographs), the recessed parts (parts other than the projected ones) are observed as dark areas while the projected parts are observed as bright areas, so it is possible to distinguish between the recessed parts and the projected parts.

It is preferable to subject the stainless steel sheet substrate to anode electrolytic treatment to form the above-described textured structure on the surface of the stainless steel sheet substrate. By controlling current density and electrolysis time during the electrolytic treatment, it is possible to obtain a textured structure as described above. Preferable examples of the anode electrolytic treatment solution include a sulfuric acid solution, an aqueous phosphoric acid solution, and an aqueous sodium sulfate solution. Controlling the electrolysis time can control the interval between parts. Specifically, a longer electrolysis time produces a wider interval between parts.

(3) Low-Electrical-Resistivity Metal Particles

Figure 2:
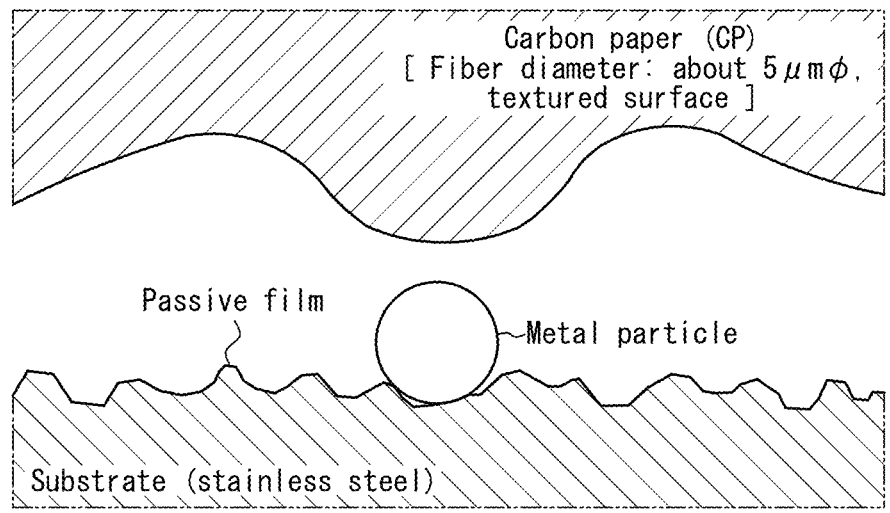
FIG. 2 schematically illustrates the mechanism of the presently disclosed stainless steel sheet for fuel cell separators where contact resistance is significantly reduced.
Figure 2:
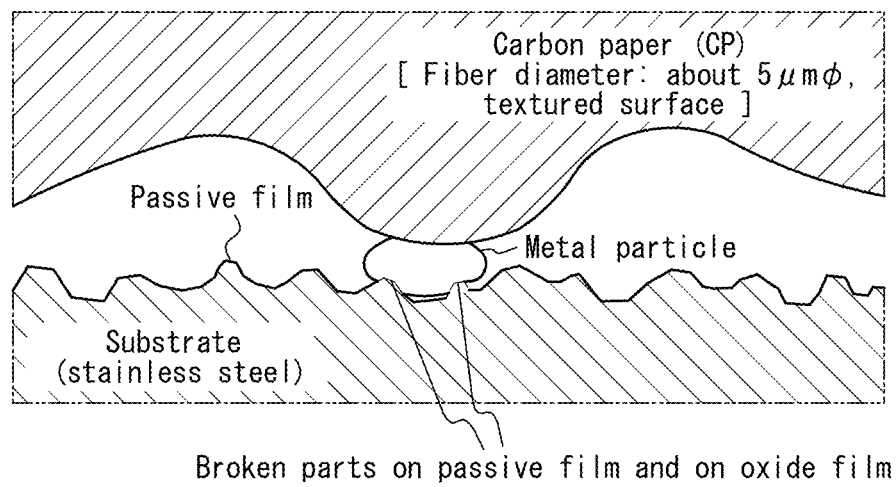

It is important for the presently disclosed stainless steel sheet for fuel cell separators to attach a predetermined amount of low-electrical-resistivity metal particles to the textured surface of the substrate and to properly control the ratio of the average particle size of the low-electrical-resistivity metal particles to the average interval between the projected parts. In this way, the low-electrical-resistivity metal particles are pressed into the projected and recessed parts on the substrate surface and the projected parts bite into the metal particles when the separator comes into contact with the gas diffusion layer, which is illustrated in FIG. 2. Then, a part of the passive film on the surface of the stainless steel sheet, particularly on the projected parts, breaks, and a part of the thin oxide film formed on the surface of the low-electrical-resistivity metal particles also breaks. The broken parts act as junctions, so that the stainless steel sheet and the low-electrical-resistivity metal particles are connected (contacted) with each other not through the passive film or the oxide film. As a result, contact resistance is significantly reduced.

The low-electrical-resistivity metal particles are preferably, for example, Cu, Ag and Au particles. It is also acceptable to use these metal particles in combination. The low-electrical-resistivity metal particles are more preferably Cu and Ag particles considering the cost.

Average particle size of the low-electrical-resistivity metal particles: 50 nm or more and 1.0 μm or less In order to obtain the effect of reducing contact resistance as described above, the average particle size (average equivalent circular diameter) of the low-electrical-resistivity metal particles is set to 50 nm or more and 1.0 μm or less.

The average particle size is preferably 100 nm or more. The average particle size is preferably 500 nm or less.

Number of low-electrical-resistivity metal particles attached to 1 μm² of the substrate surface: 1.0 or more In order to obtain a sufficient effect of reducing contact resistance, the number of low-electrical-resistivity metal particles attached to 1 μm² of the substrate surface is set to 1.0 or more. The number is more preferably 5.0 or more. The upper limit is not particularly limited, yet it is preferably 50.0 in order to avoid an increased cost.

The average particle size (average equivalent circular diameter) of the low-electrical-resistivity metal particles and the number of low-electrical-resistivity metal particles attached to 1 μm² of the substrate surface can be calculated by the following method.

Attach the low-electrical-resistivity metal particles (hereinafter also simply referred to as "metal particle") to the substrate surface and observe the surface under a scanning electron microscope (FE-SEM) with 30000 magnification for 10 locations to collect secondary electron images (SEM photographs), where the scanning electron microscope is equipped with cold field emission electron source and the accelerating voltage is set to 3 kV. Measure the equivalent circular diameter of each metal particle observed on the secondary electron images (SEM photographs), and average the results to obtain the average equivalent circular diameter of the metal particles. Note that the particle size (equivalent circular diameter) of the metal particles measured here has a lower limit of 10 nm.

The number of metal particles in 1 μm² of the substrate surface is obtained by counting the number of metal particles whose particle size has been measured as described above in each location, calculating the number of metal particles in 1 μm² and averaging the results.

A plating method or a physical vapor deposition method (PVD method) or other methods may be used to attach the low-electrical-resistivity metal particles to the textured surface of the substrate. In particular, it is preferable to use a plating method, where the low-electrical-resistivity metal particles can be attached to the textured surface of the substrate by immersing the stainless steel sheet substrate in a plating bath, which contains low-electrical-resistivity metal ions and has been adjusted to a predetermined composition, and performing electroplating or electroless plating under predetermined conditions. The number of metal particles attached to the substrate surface (hereinafter also referred to as "number of attached metal particles") is controlled by, for example, current density in a case of forming metal particles through electroplating. A higher current density can produce more attached metal particles.

Ratio of the Average Particle Size of the Low-Electrical-Resistivity Metal Particles to the Average Interval Between the Projected Parts: 1.0 or More and 15.0 or Less It is necessary to properly adjust the ratio of the average particle size of the low-electrical-resistivity metal particle to the average interval between the projected parts in order to make the projected parts on the substrate surface bite into the metal particles sufficiently and thereby obtaining a desired contact resistance. Specifically, the ratio of the average particle size of the low-electrical-resistivity metal particle to the average interval between the projected parts is set to 1.0 or more and 15.0 or less. The ratio is preferably 1.3 or more. The ratio is preferably 3.0 or less. When the ratio of the average particle size of the low-electrical-resistivity metal particle to the average interval between the projected parts is less than 1.0, the projected parts on the substrate surface cannot bite into the metal particles sufficiently, resulting in failure of obtaining a desired contact resistance. On the other hand, when the ratio of the average particle size of the low-electrical-resistivity metal particle to the average interval between the projected parts exceeds 15.0, the metal particles are too large compared to the average interval between the projected parts. Accordingly, the effect of forming projected and recessed parts on the surface is too small to obtain a desired contact resistance. In addition, a larger metal particle size requires a longer formation time, which increases the cost.

(4) Other Features

A surface-coating layer can be additionally provided after attaching the low-electrical-resistivity metal particle to the textured surface of the substrate as described above.

The surface-coating layer is not particularly limited. However, it is preferable to use a material having excellent corrosion resistance and excellent conductivity in the working environment of fuel cell separators. Preferable examples of such surface-coating layer include a metal layer, an alloy layer, a metal oxide layer, a metal carbide layer, a metal nitride layer, a carbon material layer, a conductive polymer layer, an organic resin layer containing a conductive substance, and a mixture layer of these materials.

Furthermore, skin pass rolling may be performed after attaching the low-electrical-resistivity metal particle to the textured surface of the substrate or after additionally providing the surface-coating layer. In this case, the projected parts on the substrate surface can bite deeper into the low-electrical-resistivity metal particles so as to cause breakage of the passive film on the surface of the stainless steel sheet. As a result, the stainless steel and the low-electrical-resistivity metal particles are able to connect (contact) with each other, not through the passive film, in a more effective way. Accordingly, the contact resistance can be further reduced. The elongation rate of the skin pass rolling is preferably 1% or more. The elongation rate of the skin pass rolling is preferably 10% or less.

EXAMPLES

Separators of polymer electrolyte fuel cells require a low contact resistance. In view of this required property, the following evaluation was conducted on the samples described later.

(1) Evaluation of Contact Resistance

Contact resistance was calculated by the following method. Sandwich a predetermined sample between carbon paper (TGP-H-120 of Toray Industries, Inc.). Then, contact both sides of the carbon paper-sandwiched sample with electrodes made by plating copper sheet with gold, apply a current on the carbon paper-sandwiched sample under a pressure of 0.98 MPa per unit area, which was equivalent to 10 kg/cm², measure the voltage difference between the sample and one electrode to calculate the electrical resistance, and multiply the measured value of electrical resistance by the area of the contact surface to obtain contact resistance. The contact resistance was evaluated based on the following criteria.

Pass (excellent): less than 10.0 mΩ·cm²
Pass: 10.0 mΩ·cm² or more and 15.0 mΩ·cm² or less
Fail: more than 15.0 mΩ·cm²

Example 1

Use an SUS447J1 containing 30 mass % of Cr and having a sheet thickness of 0.1 mm as a substrate, and subject the substrate to, after appropriate pretreatment such as degreasing, textured structure-forming treatment, which was an anode electrolytic treatment with the following electrolytic bath composition and under the following electrolysis conditions, to form a textured structure on the substrate surface. Subsequently, subject the substrate to low-electrical-resistivity metal particle-attaching treatment, which was a plating treatment with the following plating bath composition and under the following plating conditions, to attach low-electrical-resistivity metal particles to the substrate surface, and thereby obtaining a stainless steel sheet for separators. Note that Sample No. 9 was subjected to skin pass rolling at an elongation rate of 1%.

The obtained stainless steel sheets for separators were subjected to a property evaluation conducted in the aforementioned manner.

For comparison, stainless steel sheets for separators without subjection to either or both of the textured structure-forming treatment and the low-electrical-resistivity metal particle-attaching treatment were prepared, and an evaluation of contact resistance was conducted in the same manner as described above.

The number of projected parts on the textured structure, the average interval between the projected parts, the average particle size of the low-electrical-resistivity metal particles, and the number of metal particles attached to 1 µm² of the substrate surface were measured by the aforementioned methods.

<Conditions of the Textured Structure-Forming Treatment (Anode Electrolytic Treatment)>
Bath composition: 3% of sulfuric acid
Temperature: 40° C.
Electrolysis time: 5 seconds to 20 seconds
Anodic current density: 2 A/dm²

<Conditions of the Low-Electrical-Resistivity Metal Particle-Attaching Treatment (Plating Treatment)>
Bath composition: 3% of sulfuric acid+0.2% of Ag ion
Temperature: 40° C.
Electroplating time: 5 seconds to 100 seconds
Cathodic current density: 0.02 A/dm² to 1.50 A/dm²

Any known method other than the ones having the above bath compositions and under the above conditions may be used as long as it can form a desired fine structure and attach low-electrical-resistivity metal. For example, a plating treatment with an alkaline cyanide bath or other baths is acceptable.

Table 1 summarizes the evaluation result of contact resistance of each sample. The samples and the evaluation results were obtained as described above.

TABLE 1

| | | Conditions of preparing sample | | | | | | Textured structure on substrate surface |
|---|---|---|---|---|---|---|---|---|
| | | Conditions of forming textured structure | | | Treatment | Conditions of plating low-electrical-resistivity metal particles | | |
| Sample No. | Substrate | Treatment of forming textured structure | Anodic current density (A/dm²) | Electrolysis time (second) | of attaching low-electrical-resistivity metal particles | Cathodic current density (A/dm²) | Plating time (second) | Average interval between projected parts (nm) |
| 1 | SUS447J1 | Performed | 2 | 10 | Performed | 0.50 | 10 | 66 |
| 2 | | Not performed | — | — | Not performed | — | — | — |
| 3 | | Performed | 2 | 10 | Not performed | — | — | 71 |
| 4 | | Not performed | — | — | Performed | 0.65 | 10 | — |
| 5 | | Performed | 2 | 20 | Performed | 0.05 | 90 | 165 |
| 6 | | Performed | 2 | 10 | Performed | 0.40 | 15 | 70 |
| 7 | | Performed | 2 | 10 | Performed | 1.00 | 5 | 70 |
| 8 | | Performed | 2 | 10 | Performed | 0.60 | 10 | 74 |
| 9 | | Performed | 2 | 10 | Performed | 0.80 | 8 | 68 |
| 10 | | Performed | 2 | 8 | Performed | 0.30 | 20 | 60 |
| 11 | | Performed | 2 | 5 | Performed | 0.08 | 60 | 35 |
| 12 | | Performed | 2 | 5 | Performed | 0.05 | 90 | 35 |
| 13 | | Performed | 2 | 10 | Performed | 0.10 | 80 | 70 |
| 14 | | Performed | 2 | 10 | Performed | 1.50 | 5 | 75 |
| 15 | | Performed | 2 | 5 | Performed | 0.02 | 100 | 35 |

| Sample No. | Low-electrical-resistivity metal particles | | | Ratio of average particle size of low-electrical-resistivity metal particles to average interval between projected parts | Evaluation results | | |
|---|---|---|---|---|---|---|---|
| | Type | Average particle size (nm) | Number of metal particles attached to 1 µm² | | Contact resistance (mΩ·cm²) | Evaluation | Remarks |
| 1 | Ag | 120 | 8.1 | 1.8 | 6.3 | Excellent | Example |
| 2 | — | — | — | — | 188.1 | Fail | Comparative example |
| 3 | — | — | — | — | 15.9 | Fail | Comparative example |
| 4 | Ag | 125 | 10.2 | — | 47.9 | Fail | Comparative example |
| 5 | Ag | 430 | 1.3 | 2.6 | 9.7 | Excellent | Example |
| 6 | Ag | 190 | 3.2 | 2.7 | 8.6 | Excellent | Example |
| 7 | Ag | 75 | 13.8 | 1.1 | 10.4 | Pass | Example |
| 8 | Cu | 105 | 7.2 | 1.4 | 7.5 | Excellent | Example |
| 9 | Ag | 100 | 11.1 | 1.5 | 6.1 | Excellent | Example |
| 10 | Ag | 210 | 2.8 | 3.5 | 10.6 | Pass | Example |
| 11 | Ag | 325 | 2.1 | 9.3 | 12.3 | Pass | Example |
| 12 | Ag | 460 | 1.3 | 13.1 | 14.4 | Pass | Example |

TABLE 1-continued

| | | | | | | | |
|---|---|---|---|---|---|---|---|
| 13 | Ag | 255 | 0.4 | 3.6 | 15.1 | Fail | Comparative example |
| 14 | Ag | 60 | 15.7 | 0.8 | 15.6 | Fail | Comparative example |
| 15 | Ag | 540 | 1.2 | 15.4 | 38.2 | Fail | Comparative example |

The table reveals the following points.

(a) Sample Nos. 1, 5 to 12, which are examples of the present disclosure, have a low contact resistance and good conductivity. Additionally, Sample Nos. 1, 5, 6, 8 and 9, which are examples of the present disclosure, are particularly excellent in contact resistance.

(b) On the other hand, Sample No. 2, which is a comparative example, has neither predetermined textured structure formed on the substrate surface nor low-electrical-resistivity metal particles attached to the substrate surface, and therefore fails to obtain a desired contact resistance.

(c) Sample No. 3, which is a comparative example, has no low-electrical-resistivity metal particles attached to the substrate surface, and therefore fails to obtain a desired contact resistance.

(d) Sample No. 4, which is a comparative example, has no predetermined textured structure formed on the substrate surface, and therefore fails to obtain a desired contact resistance.

(e) The number of low-electrical-resistivity metal particles attached to 1 $\mu m^2$ of Sample No. 13, which is a comparative example, is less than 1.0, and therefore Sample No. 13 fails to obtain a desired contact resistance.

(f) The ratio of the average particle size of the low-electrical-resistivity metal particles to the average interval between the projected parts of Sample No. 14, which is a comparative example, is less than 1.0, and therefore Sample No. 14 fails to obtain a desired contact resistance.

(g) The ratio of the average particle size of the low-electrical-resistivity metal particles to the average interval between the projected parts of Sample No. 15, which is a comparative example, is more than 15.0, and therefore Sample No. 15 fails to obtain a desired contact resistance.

REFERENCE SIGNS LIST 1 membrane-electrode joined body
2, 3 gas diffusion layer
4, 5 separator
6 air passage
7 hydrogen passage

The invention claimed is:

1. A stainless steel sheet for fuel cell separators comprising a substrate made of stainless steel sheet, and low-electrical-resistivity metal particles, wherein
   the substrate has a textured structure on a surface thereof, where the textured structure includes projected parts and recessed parts, and an average interval between the projected parts is 10 nm or more and 300 nm or less,
   the low-electrical-resistivity metal particles have an average particle size of 50 nm to 1.0 µm, and the low-electrical-resistivity metal particles are attached to the surface of the substrate having the textured structure at a density of 1.0 particle or more for 1 $\mu m^2$, and
   a ratio of the average particle size of the low-electrical-resistivity metal particles to the average interval between the projected parts is 1.0 to 15.0.

2. A method for producing the stainless steel sheet for fuel cell separators according to claim 1, comprising
   subjecting a substrate made of stainless steel sheet to anode electrolytic treatment and then to plating treatment, where the plating treatment is performed in a solution containing low-electrical-resistivity metal ions.

* * * * *